United States Patent
Lahnala

(10) Patent No.: US 9,878,599 B2
(45) Date of Patent: Jan. 30, 2018

(54) SLIDING WINDOW ASSEMBLY INCLUDING A DRAIN HOLE

(71) Applicant: AGC Automotive Americas R&D Inc., Ypsilanti, MI (US)

(72) Inventor: David W. Lahnala, Adrian, MI (US)

(73) Assignee: AGC AUTOMOTIVE AMERICAS R&D, INC., Ypsilanti, MI (US)

( * ) Notice: Subject to any disclaimer, the term of this patent is extended or adjusted under 35 U.S.C. 154(b) by 0 days.

(21) Appl. No.: 14/345,854

(22) PCT Filed: Sep. 20, 2012

(86) PCT No.: PCT/US2012/056379
§ 371 (c)(1),
(2) Date: Mar. 19, 2014

(87) PCT Pub. No.: WO2013/043899
PCT Pub. Date: Mar. 28, 2013

(65) Prior Publication Data
US 2014/0230333 A1    Aug. 21, 2014

Related U.S. Application Data

(60) Provisional application No. 61/536,641, filed on Sep. 20, 2011.

(51) Int. Cl.
*B60J 1/18*    (2006.01)
*E05F 11/53*   (2006.01)
*E06B 7/14*    (2006.01)

(52) U.S. Cl.
CPC .......... *B60J 1/1853* (2013.01); *E05F 11/535* (2013.01); *E06B 7/14* (2013.01)

(58) Field of Classification Search
CPC ...... B60J 1/1853; B60J 1/1838; B60J 1/1846; E06B 7/14
USPC .............. 49/380, 413, 409; 296/190.1, 201, 296/146.16
See application file for complete search history.

(56) References Cited

U.S. PATENT DOCUMENTS

| | | | |
|---|---|---|---|
| 4,934,098 A * | 6/1990 | Prouteau ................ | B60J 7/053 296/213 |
| 5,522,191 A * | 6/1996 | Wenner et al. ........... | 52/204.51 |
| 5,996,284 A | 12/1999 | Freimark et al. | |
| 6,054,195 A * | 4/2000 | Collins et al. ................ | 428/34 |

(Continued)

OTHER PUBLICATIONS

International Search Report for Application No. PCT/US2012/056379 dated Nov. 29, 2012, 2 pages.

*Primary Examiner* — Katherine W Mitchell
*Assistant Examiner* — Catherine A Kelly
(74) *Attorney, Agent, or Firm* — Howard & Howard Attorneys PLLC

(57) ABSTRACT

A sliding window assembly for a vehicle includes a fixed panel and a sliding panel moveable relative to the fixed panel. A track is connected to the fixed panel. The track includes an elongated member having a base portion and first and second legs extending from the base portion to define a channel. The first leg is connected to the fixed panel and the second leg is spaced from the first leg. The sliding panel is disposed within the channel and is slidable along the track relative to the fixed panel. The first leg defines a drain hole in communication with the channel and an exterior of the vehicle for draining water from the channel to the exterior of the vehicle.

14 Claims, 11 Drawing Sheets

(56) References Cited

U.S. PATENT DOCUMENTS

| | | | |
|---|---|---|---|
| 7,051,478 B2* | 5/2006 | Bourque et al. | 49/413 |
| 7,073,293 B2* | 7/2006 | Galer | 49/413 |
| RE40,636 E | 2/2009 | Weinert et al. | |
| 7,735,897 B2 | 6/2010 | Seiple et al. | |
| 7,810,284 B2* | 10/2010 | Murphy et al. | 49/380 |
| 8,915,018 B2* | 12/2014 | Snider | 49/413 |
| 2003/0137161 A1 | 7/2003 | Gillen | |
| 2006/0107600 A1* | 5/2006 | Nestell et al. | 49/413 |
| 2007/0033887 A1* | 2/2007 | Ambrose | 52/171.3 |
| 2007/0157522 A1* | 7/2007 | Hebert et al. | 49/413 |
| 2009/0217595 A1 | 9/2009 | Grimm et al. | |
| 2009/0293368 A1 | 12/2009 | Repp et al. | |
| 2010/0122494 A1* | 5/2010 | Lahnala | 49/358 |
| 2010/0122495 A1 | 5/2010 | Lahnala | |
| 2010/0122497 A1 | 5/2010 | Lahnala | |
| 2011/0219702 A1 | 9/2011 | Recker | |

* cited by examiner

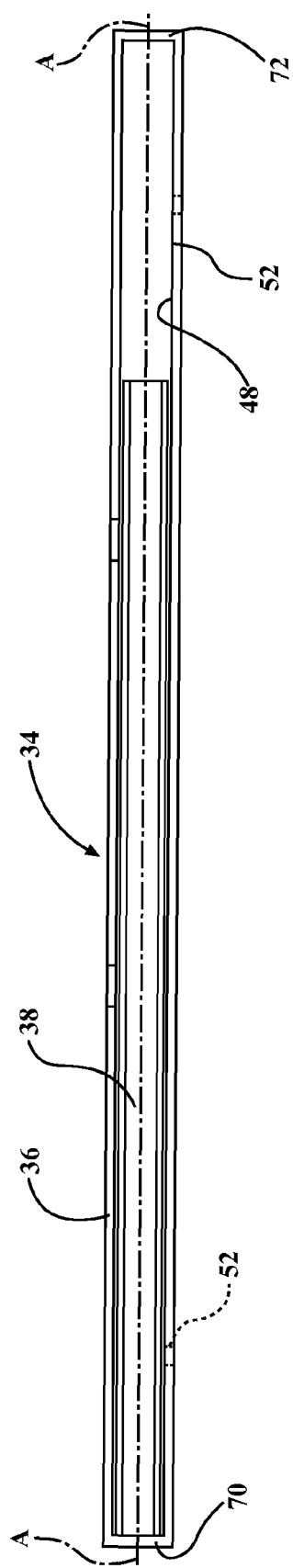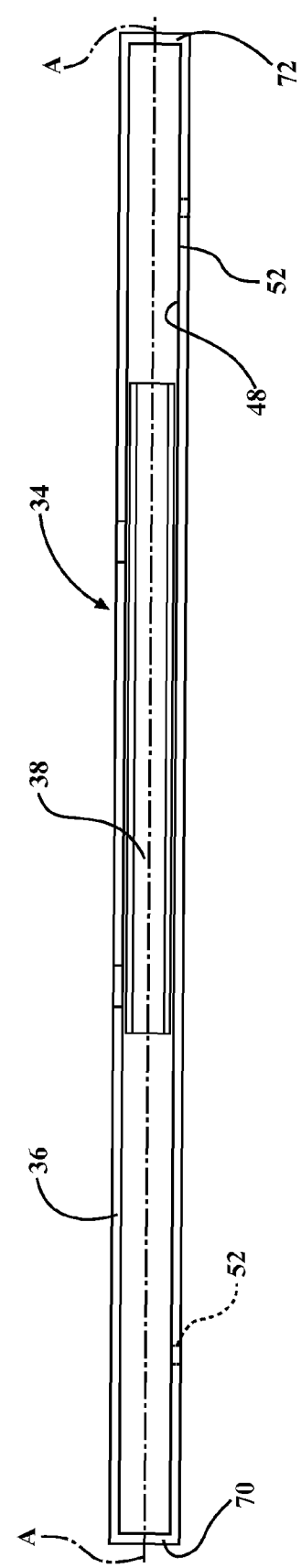

SLIDING WINDOW ASSEMBLY INCLUDING A DRAIN HOLE

CROSS-REFERENCE TO RELATED APPLICATIONS

This application is the National Stage of International Patent Application No. PCT/US2012/056379, filed on Sep. 20, 2012, which claims priority to and all the advantages of U.S. Provisional Patent Application Ser. No. 61/536,641, which was filed on Sep. 20, 2011, the entire specification of which is expressly incorporated herein by reference.

BACKGROUND OF THE INVENTION

1. Field of the Invention

The invention generally relates to a sliding window assembly for a vehicle. More specifically, the invention relates to a sliding window assembly having a drain hole for draining water to an exterior side of a vehicle.

2. Description of the Related Art

Sliding window assemblies for vehicles are known in the art and have been widely used by vehicle manufacturers. Conventional sliding window assemblies typically include at least one fixed panel and a sliding panel moveable relative to the fixed panel. More specifically, the sliding panel moves along a first track and a second track between an open position and a closed position. The first track and the second track are coupled to the fixed panel and are spaced from each other for receiving a different edge of the sliding panel. The channels guide the sliding panel between the open and closed positions.

Under certain circumstances, such as inclement weather, water or other weather elements can enter the tracks of the conventional sliding window assemblies from an exterior side of the conventional sliding window assemblies. Once the water is within the tracks, the water may enter an interior side of the conventional sliding window assemblies and eventually reach an interior of the vehicle. Such migration of the water can cause water damage, mold growth, etc., in the interior of the vehicle and can give the vehicle an overall feel of low quality.

Attempts to control water on the interior side of the conventional sliding window assemblies have been costly. These attempts include performing secondary steps after the conventional sliding window assemblies are assembled to add features for controlling the water. These secondary steps require labor and time, both of which cause an unwanted increase in the cost to manufacture the sliding window assembly. Accordingly, it would be advantageous to improve the conventional sliding window assemblies.

SUMMARY OF THE INVENTION AND ADVANTAGES

The present invention includes a sliding window assembly for a vehicle comprising a fixed panel. A sliding panel is moveable relative to the fixed panel. A track is connected to the fixed panel. The track includes an elongated member having a base portion and first and second legs extending from the base portion to define a channel. The first leg is connected to the fixed panel and the second leg is spaced from the first leg. The sliding panel is disposed within the channel and is slidable along the track relative to the fixed panel. The first leg defines a drain hole in communication with the channel and an exterior of the vehicle for draining water from the channel to the exterior of the vehicle.

The present invention also includes a sliding window assembly for a vehicle comprising a first fixed panel and a second fixed panel. The second fixed panel is spaced from the first fixed panel to defining an opening therebetween. A sliding panel is moveable relative to the fixed panels. A track is connected to the fixed panels and spans the opening. The track includes an elongated member having a base portion and first and second legs extending from the base portion to define a channel. The first leg is connected to the fixed panels and the second leg is spaced from the first leg. The sliding panel is disposed within the channel and slidable along the track relative to the fixed panels. The first leg defines a drain hole in communication with the channel and an exterior of the vehicle for draining water from the channel to the exterior of the vehicle.

The sliding window assembly advantageously drains water from the channel through the drain hole, for example, to prevent the disadvantages described above. Further, the location of the drain hole in the elongated member between the rail and the first end of the channel advantageously allows for the drain hole to be molded into the elongated member. By molding the drain hole into the elongated member, secondary manufacturing steps are eliminated thereby reducing labor and time to manufacture the sliding window assembly, thereby reducing the cost to manufacture the sliding window assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 11 is a top view of a track showing a channel defined by an elongated member of the track with a rail disposed within the channel and spaced from a second end of the elongated member; and FIG. 12 is a top view of the track showing the channel with the rail disposed within the channel and spaced from a first end and the second

DETAILED DESCRIPTION OF THE INVENTION

Figure 1:
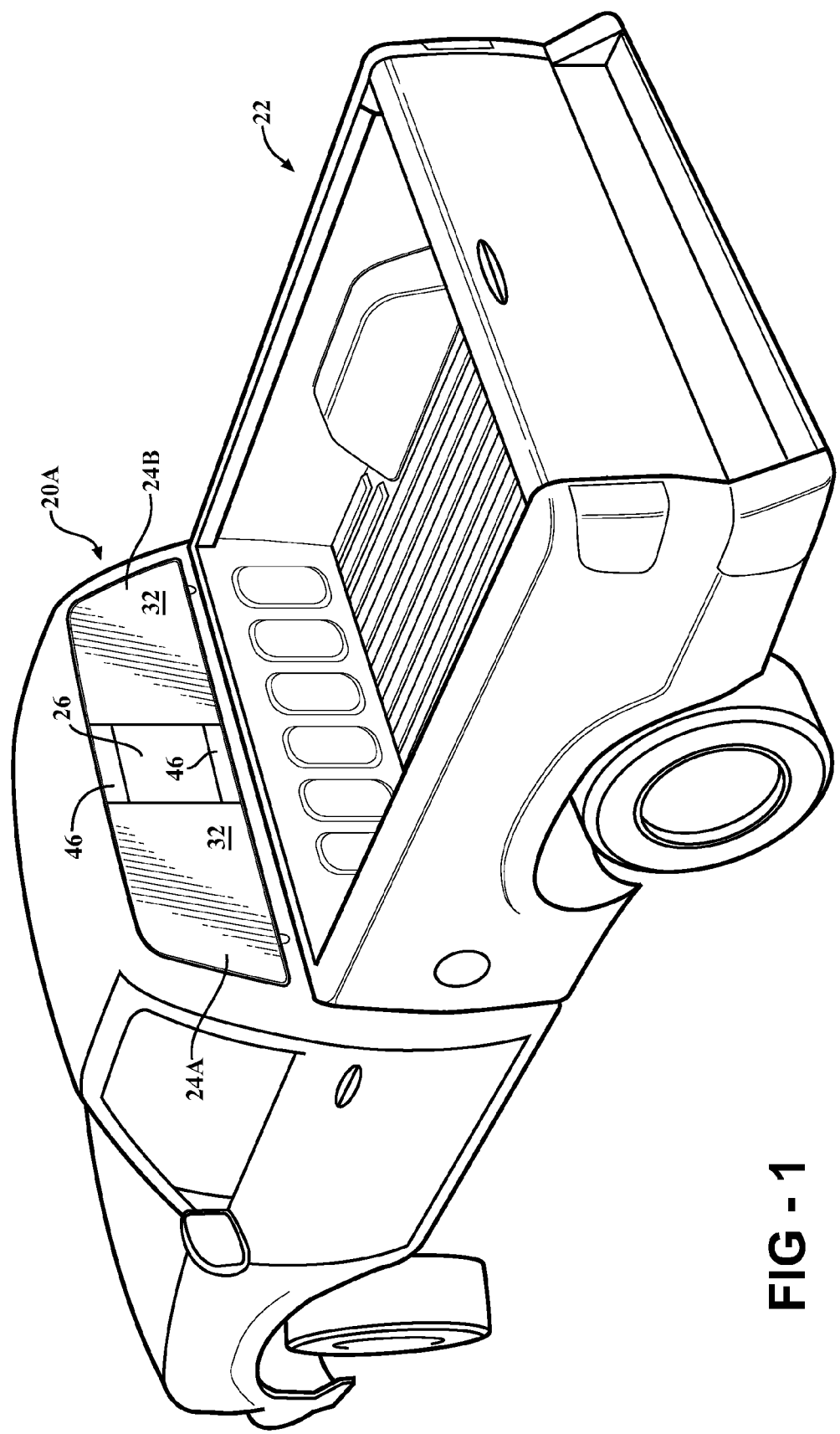
FIG. 1 is a perspective view of a three-piece sliding window assembly coupled to a vehicle.
Figure 2:
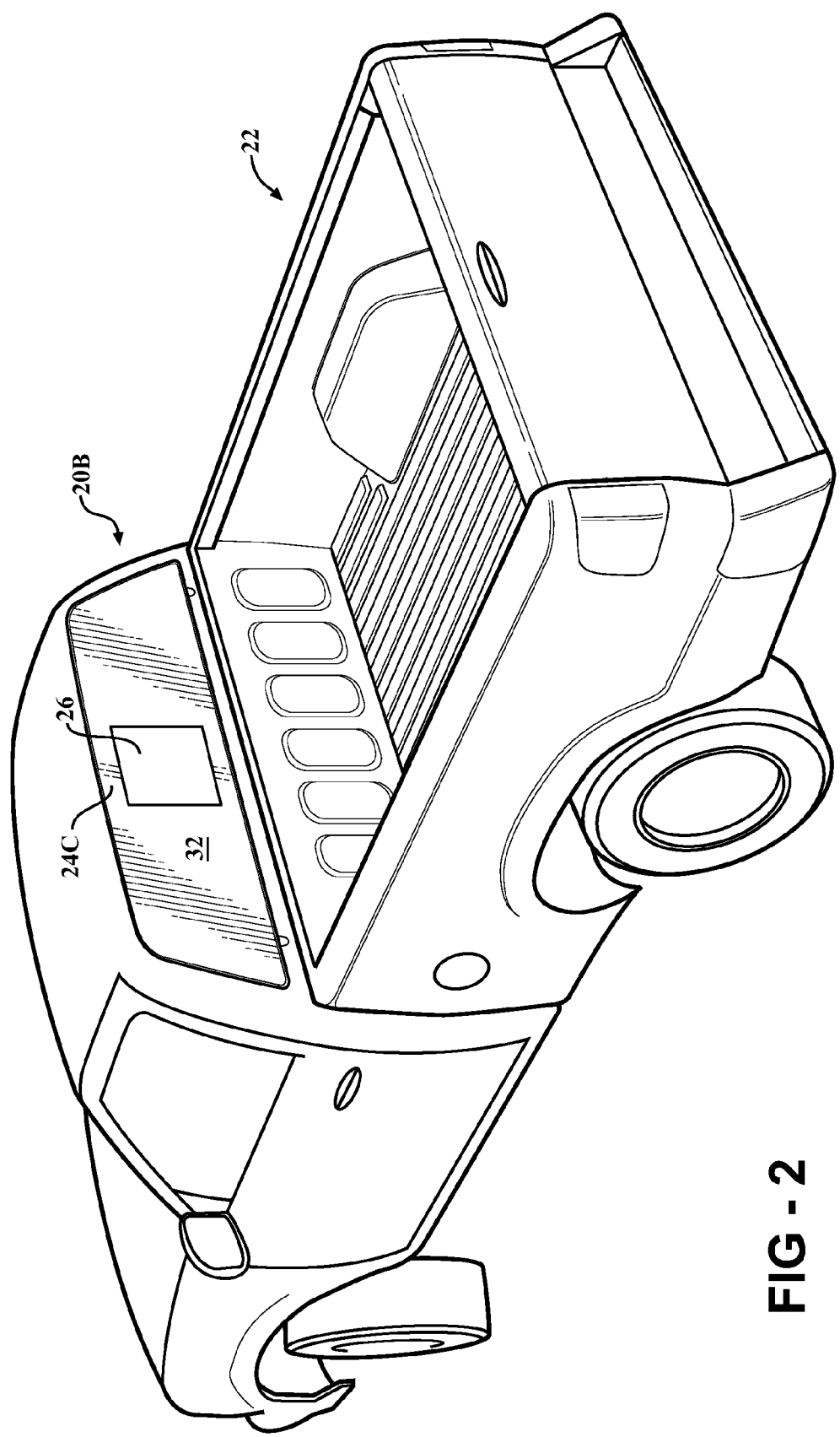
FIG. 2 is a perspective view of a two-piece sliding window assembly coupled to the vehicle.

With reference to the Figures, wherein like numerals indicate corresponding parts throughout the several views, a sliding window assembly 20A, 20B for installation in a vehicle 22 is generally shown. With reference to FIGS. 1 and 2, the sliding window assembly 20A, 20B is shown coupled to the vehicle 22, specifically as a backlite of a pickup truck. However, it is to be appreciated that the sliding window assembly 20A, 20B can be implemented in other types of vehicles, as well as in non-vehicle applications.

Figure 3:
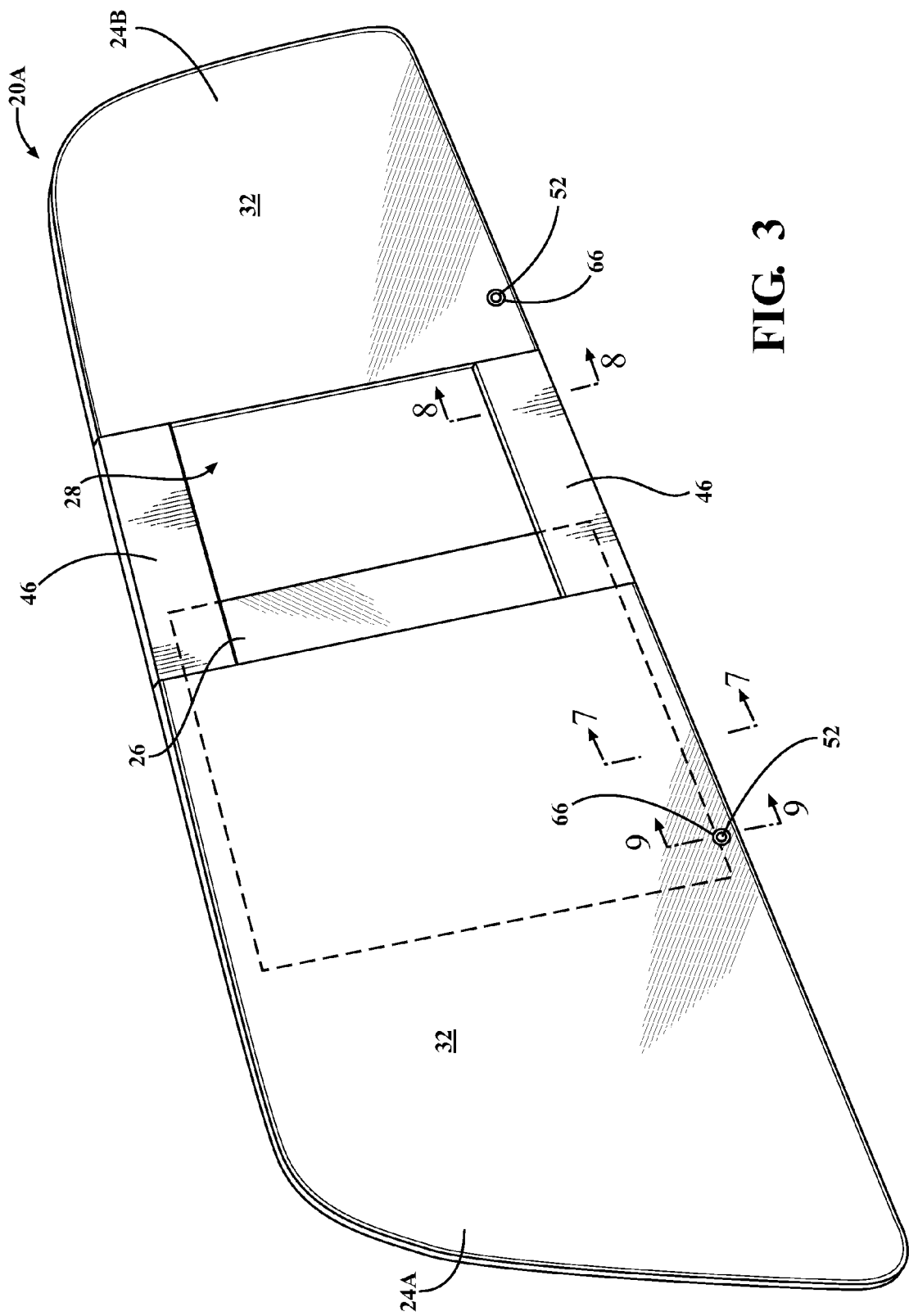
FIG. 3 is a perspective view of an exterior surface of the three-piece sliding window assembly having a plurality of drain holes.
Figure 4:
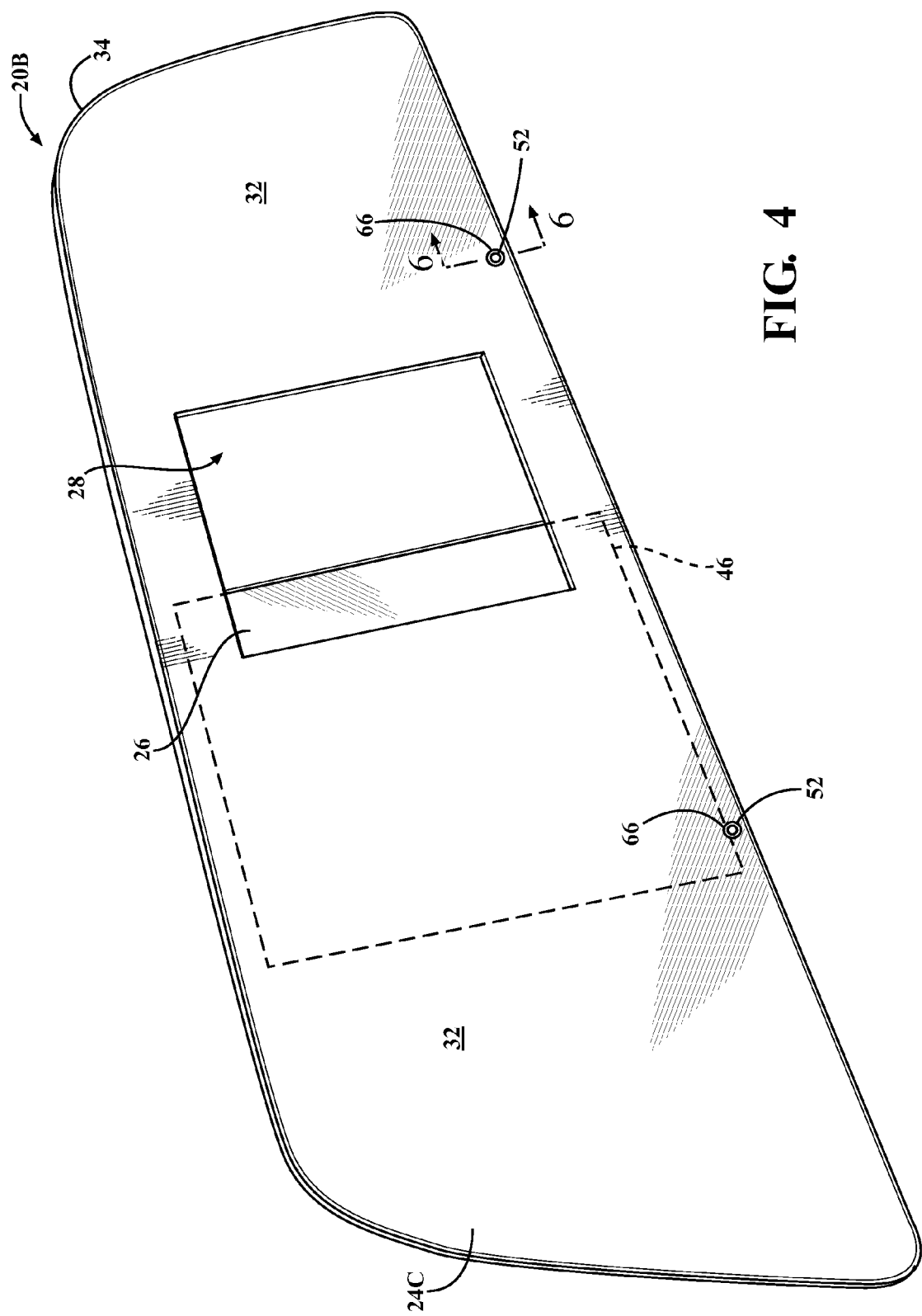
FIG. 4 is a perspective view of an exterior surface of the two-piece sliding window assembly having the plurality of drain holes.

The sliding window assembly 20A, 20B includes at least one fixed panel 24A, 24B, 24C and a sliding panel 26 moveable relative to the fixed panel 24A, 24B, 24C. For example, as shown in FIGS. 1 and 3, the sliding window assembly 20A, 20B may be a three-piece sliding window assembly 20A, which includes the sliding panel 26 and a pair of fixed panels. When the sliding window assembly 20A, 20B is the three-piece sliding window assembly 20A, the pair of fixed panels are referred to as a first fixed panel 24A and a second fixed panel 24B. In the three-piece sliding window assembly 20A, the second fixed panel 24B is spaced from the first fixed panel 24A thereby defining an opening 28 therebetween. Alternatively, as shown in FIGS. 2 and 4, the sliding window assembly 20A, 20B may be a two-piece sliding window assembly 20B, which includes the sliding panel 26 and a single fixed panel 24A, 24B, 24C, which defines the opening 28. It should be appreciated that the sliding window assembly 20A, 20B can include more than two fixed panels 24A, 24B without departing from the nature of the present invention. For simplicity, common features between the three-piece sliding window assembly 20A and the two-piece sliding window assembly 20B have common reference numbers. Also for simplicity, the term "sliding window assembly 20A, 20B" is used hereinafter to refer to the he three-piece sliding window assembly 20A and/or the two-piece sliding window assembly 20B. For further simplicity, the term "fixed panel 24A, 24B, 24C" is used hereinafter to refer to the first and second fixed panels 24A, 24B of the three-piece sliding window assembly 20A and/or the single fixed panel 24C of the two-piece sliding window assembly 20B.

The sliding panel 26 may be disposed in an offset relationship to the fixed panel 24A, 24B, 24C. Said differently, the sliding panel 26 may overlap the fixed panel 24A, 24B, 24C in both the open and closed positions. Alternatively, the sliding panel 26 may be in-line with the fixed panel 24A, 24B, 24C when the sliding panel 26 is in the closed position and move into the offset relationship as the sliding panel 26 moves toward to the open position.

Figure 5:
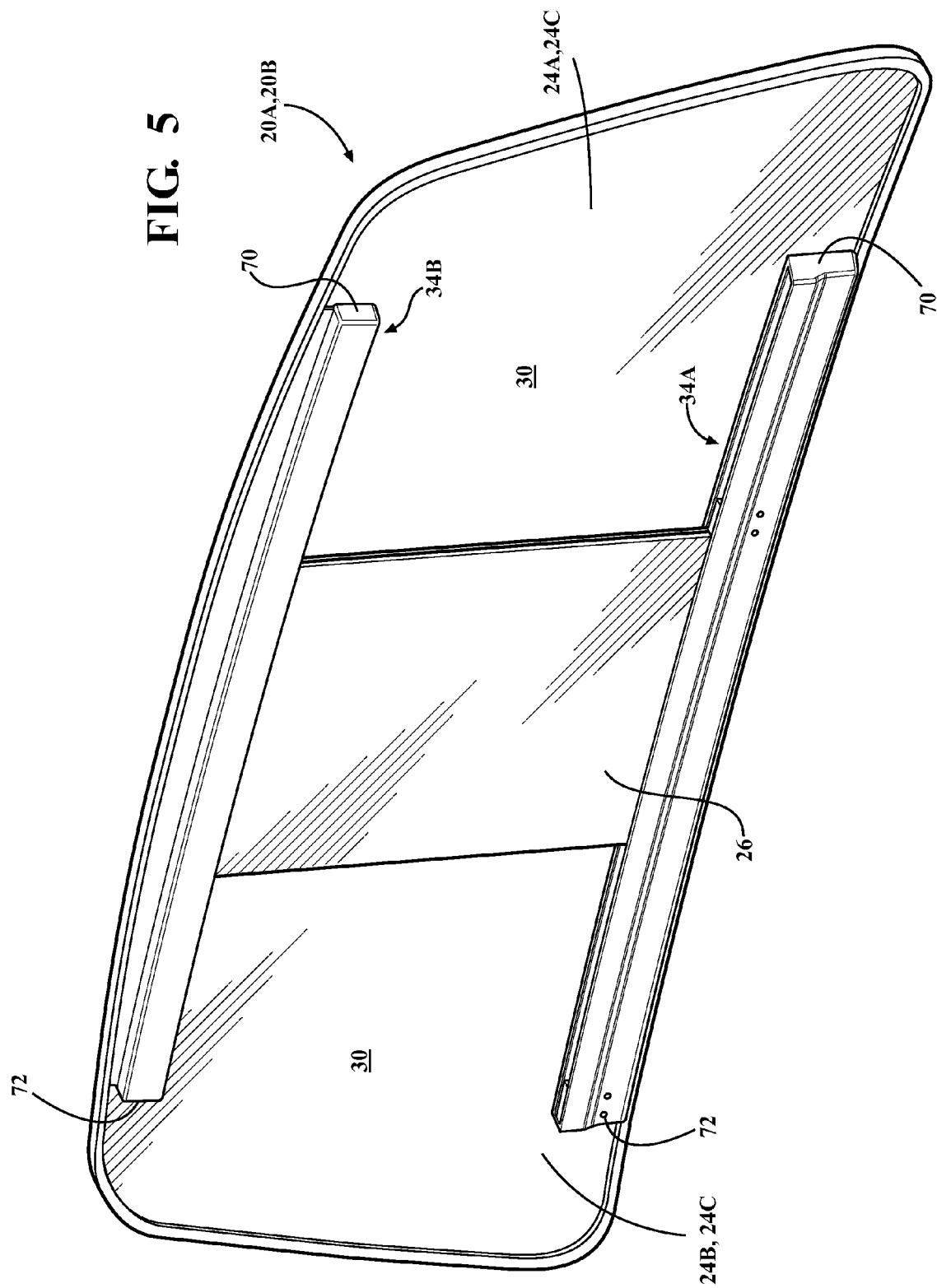
FIG. 5 is a representative perspective view of an interior surface of both the three-piece sliding window assembly and the two-piece sliding window assembly.

The fixed panel 24A, 24B, 24C and the sliding panel 26 are typically formed of glass. However, the fixed panel 24A, 24B, 24C and the sliding panel 26 may be formed from any suitable material such as plastic, metal, etc. Generally, the fixed panel 24A, 24B, 24C is configured for coupling with the vehicle 22. The fixed panel 24A, 24B, 24C has an interior surface 30 facing an interior of the vehicle 22 and an exterior surface 32 facing an exterior of the vehicle 22 when the sliding window assembly 20A, 20B is coupled to the vehicle 22. FIG. 3 shows the exterior surface 32 of the three-piece sliding window assembly 20A. FIG. 4 shows the exterior surface 32 of the two-piece sliding window assembly 20B. FIG. 5 shown the interior surface 30, which is representative of both the three-piece sliding window assembly 20A and the two-piece sliding window assembly.

The sliding panel 26 is movable relative to the fixed panel 24A, 24B, 24C to vary a size of the opening 28. More specifically, the sliding panel 26 is moveable relative to the fixed panel 24A, 24B, 24C for completely covering the opening 28 in a closed position and for at least partially uncovering the opening 28 in an open position. The sliding panel 26 can be either manually operated for moving the sliding panel 26 relative to the fixed panel 24A, 24B, 24C or the sliding panel 26 can be powered for moving the sliding panel 26 by a motor operatively coupled to the sliding panel 26.

As best shown in FIG. 5, the sliding window assembly 20A, 20B includes at least one track 34 commonly referred to in the industry as a run channel. The track 34 is connected to the fixed panel 24A, 24B, 24C. It is to be appreciated that when the sliding window assembly 20A, 20B includes the pair of fixed panels 24A, 24B, the track 34 is typically coupled to both of the fixed panels 24A, 24B. Additionally, when the sliding window assembly 20A, 20B includes the pair of fixed panels 24A, 24B, the track 34 rigidly interconnects the pair of fixed panels 24A, 24B. The sliding window assembly 20A, 20B may include a first track 34A coupled to the fixed panel 24A, 24B, 24C and a second track 34B coupled to the fixed panel 24A, 24B, 24C spaced from and substantially parallel to the first track 34A. As such, for simplicity, common features between the first and second tracks 34A, 34B have common reference numbers and only the first track 34A is described in detail below and is hereinafter referred to as the track 34.

As best shown in FIGS. 6-9, the sliding panel 26 is in sliding engagement with the track 34 and is slideable along the track 34 relative to the fixed panel 24A, 24B, 24C. The track 34 guides the sliding panel 26 as the sliding panel 26 moves between the closed position and the open position. Typically, the track 34 spans the opening 28 for allowing the sliding panel 26 to completely move beyond the opening 28 for completely uncovering the opening 28.

The sliding panel 26 typically slides horizontally along the track 34, but it should be appreciated that the sliding panel 26 can also slide in other directions, e.g., vertically, without departing from the nature of the present invention. It should also be appreciated that the sliding panel 26 can slide in more than one direction from the closed to the open positions. Typically, when the sliding panel 26 is moveable horizontally, the track 34 extend horizontally along the fixed panel 24A, 24B, 24C. Alternatively, when the sliding panel 26 is moveable vertically, the track 34 extend vertically between a periphery of the fixed panel 24A, 24B, 24C.

With reference to FIGS. 6-9, the track 34 typically includes an elongated member 36. The elongated member 36 is connected to the fixed panel 24A, 24B, 24C for coupling the track 34 to the fixed panel 24A, 24B, 24C. Generally, as shown in FIGS. 11 and 12, the elongated member 36 extends between a first end 70 and a second end 72 along an axis A. The elongated member 36 has a base portion 58 and first and second legs 60A, 60B extending from the base portion 58 to define a channel 48. Generally, the channel 48 is U-shaped in cross-section. The channel 48 of the elongated member 36 receives the sliding panel 26 for guiding the sliding panel 26 between the open and closed positions. Said differently, the sliding panel 26 is disposed within the channel 48 and is slidable along the track 34 relative to the fixed panel 24A, 24B, 24C.

The first leg 60A is connected to the fixed panel 24A, 24B, 24C and the second leg 60B is spaced from the first leg 60A. Connecting the first leg 60A to the fixed panel 24A, 24B, 24C connects the track 24A, 24B, 24C to the fixed panel 24A, 24B, 24C. The track 34 is typically connected to the fixed panel 24A, 24B, 24C by adhesive surface bonding. Although not required, adhesive surface bonding can be a process referred to in industry as glass encapsulation. The glass encapsulation process can be further defined as single-sided encapsulation, two-sided encapsulation, or three-sided encapsulation. For example, with single-sided encapsulation, the track 34 is coupled to the interior surface 30 of the fixed panel 24A, 24B, 24C leaving the exterior surface 32 of the fixed panel 24A, 24B, 24C free of the adhesive surface bonding. In the embodiment shown in the Figures, the track 34 is coupled to the fixed panel 24A, 24B, 24C by single-sided encapsulation. It should be appreciated that the adhesive surface bonding can be any type of adhesive surface bonding other than glass encapsulation without departing from the nature of the present invention.

In glass encapsulation, an encapsulant material forms at least a portion of the track 34 and connects the track 34 to the fixed panel 24A, 24B, 24C. Specifically, the elongated member 36 is formed of the encapsulant material and is therefore coupled to the fixed panel 24A, 24B, 24C by glass encapsulation. The encapsulant material is typically introduced to the fixed panel 24A, 24B, 24C in molten form and solidifies in the presence of the fixed panel 24A, 24B, 24C to form the elongated member 36 of the track 34. As such, the track 34 is formed of the encapsulated material, i.e., encapsulant material that was formed into the shape of the track 34 in the molten state and allowed to solidified during the glass encapsulation process. The encapsulant material is typically polyvinyl chloride (PVC). However, it should be appreciated that the encapsulant material may be formed from any type of material suitable for glass encapsulation.

When the sliding window assembly 20A, 20B is the two-piece sliding window assembly 20B, the elongated member 36 is spaced from a bottom 40 of the fixed panel 24A, 24B, 24C for exposing a portion of the fixed panel 24A, 24B, 24C about an entire periphery of the fixed panel 24A, 24B, 24C and thus an entire periphery of the sliding window assembly 20A, 20B. Exposing the entire periphery allows the fixed panel 24A, 24B, 24C to be directly adhered to a flange on the vehicle 22. Alternatively, when the sliding window assembly 20A, 20B is the three-piece sliding window assembly 20A, the elongated member 36 has an attachment stem 42 extending from a body portion 44 of the elongated member 36 for providing a bonding surface to receive the adhesive to bond the fixed panels 24A, 24B to the flange of the vehicle 22 More specifically, the elongated member 36 may include the attachment stem 42 extending from the base portion 58 of the elongated member 36 opposite the first leg 60A.

In the three-piece sliding window assembly 20A, the fixed panels 24A, 24B do not extend about the entire periphery of the sliding window assembly 20A, 20B. As such, the bonding surface of the attachment stem 42 of the elongated member 36 is an extension of the fixed panels 24A, 24B for allowing the fixed panels 24A, 24B to be bonded to the vehicle 22 at the opening 28. In the three-piece sliding window assembly 20A an appliqué 46 is used to cover elongated member 36 exposed between the fixed panels 24A, 24B.

The track 34 may also include a rail 38 coupled to the elongated member 36. The rail 38 is typically disposed within the channel 48 between the sliding panel 26 and the elongated member 36. When the rail 38 is present, both the rail 38 and the elongated member 36 extend along the axis A. As shown in FIGS. 11 and 12, it is to be appreciated that the rail 38 may extend along the axis A over a full length of the elongated member 36 or the rail 38 may be shorter than the elongated member 36 such that the rail 38 is only disposed within a portion of the channel 48 of the elongated member 36. Said differently, the rail 38 is spaced from the first and second ends 70, 72 of the elongated member 36. It is to be appreciated that the track 34 may alternatively be manufactured without the rail 38. Said differently, it is to be appreciated that the track 34 may only comprise the elongated member 36.

Typically, the rail 38 has a bottom wall 74 and first and second fingers 76, 78 extending from the bottom wall 74. When present, the first finger 76 of the rail 38 is adjacent the first leg 60A, the second finger 78 of the rail 38 is spaced from the first finger 76 and adjacent the second leg 60B of the elongated member 36, and the bottom wall 74 of the rail 38 is adjacent the bottom portion 58 of the elongated member 36.

The rail 38 is rigid relative to the elongated member 36 for reinforcing the elongated member 36. In other words, the rail 38 provides structural reinforcement to the elongated member 36. The rail 38 is typically formed of metal, such as aluminum; however, it is to be appreciated that the rail 38 may be formed of any suitable material without departing from the scope of the present invention.

The track 34 of the sliding window assembly 20A, 20B defines at least one drain hole 52 in communication with the channel 48 and an exterior of the vehicle 22 for allowing weather elements, such as water, to exit the channel 48. More specifically, the first leg 60A of the elongated member 36 defines the drain hole 52 for draining water from the channel 48 to the exterior of the vehicle 22. Typically, the drain hole 52 is molded into the elongated member 36. In other words, the drain hole 52 is formed by molding during the formation of the elongated member 36.

Generally, the legs 60A, 60B of the elongated member 36 run vertically relative to the fixed panel 24A, 24B, 24C, the drain hole 52 generally extends horizontally at the elongated member 36. Said differently, the legs 60A, 60B of the elongated member 36 extend from the base portion 58 toward the sliding panel 26 and the drain hole 52 defined by the elongated member 36 is transverse to the sliding panel 26 within the channel 48. However, it is to be appreciated that the drain hole 52 may be pitched at the elongated member 36 to promote positive drainage of weather elements that enter the channel 48. Because the first leg 60A defines the drain hole 52, the base portion 58 of the elongated member 36 is free of any holes to drain water.

When the rail 38 is employed, both the rail 38 and the elongated member 36 define the drain hole 52. More specifically, when the rail 38 is present, the drain hole 52 may be further defined by the first finger 76 of the rail 38 such that the drain hole 52 is defined by the first leg 60A of the elongated member 36 and the first finger 76 of the rail 38. As described above, it is to be appreciated that the rail 38 may be shorter than the elongated member 36 along the axis A. As such, even if the rail 38 is employed, the drain hole 52 may be formed only in the elongated member 36 outside the presence of the rail 38, such that only the elongated member 36 defines the drain hole 52.

Typically, the drain hole 52 is molded into the elongated member 36 as the elongated member 36 is formed from the encapsulant material. In other words, the drain hole 52 is formed by molding during the formation of the elongated member 36. Because the drain hole is defined by the elongated member 36, the drain hole 52 has a drain inlet 54 in communication with the channel 48 of the elongated member 36 of the track 34. The drain hole 52 also has a drain outlet 56 in communication with the exterior of the vehicle 22 and in communication with the drain inlet 54. As such, the drain hole 52 is defined between the drain inlet 54 and the drain outlet 56. Generally, the drain inlet 54 and drain outlet 56 are defined by the first leg 60A of the elongated member 36.

Figure 6:
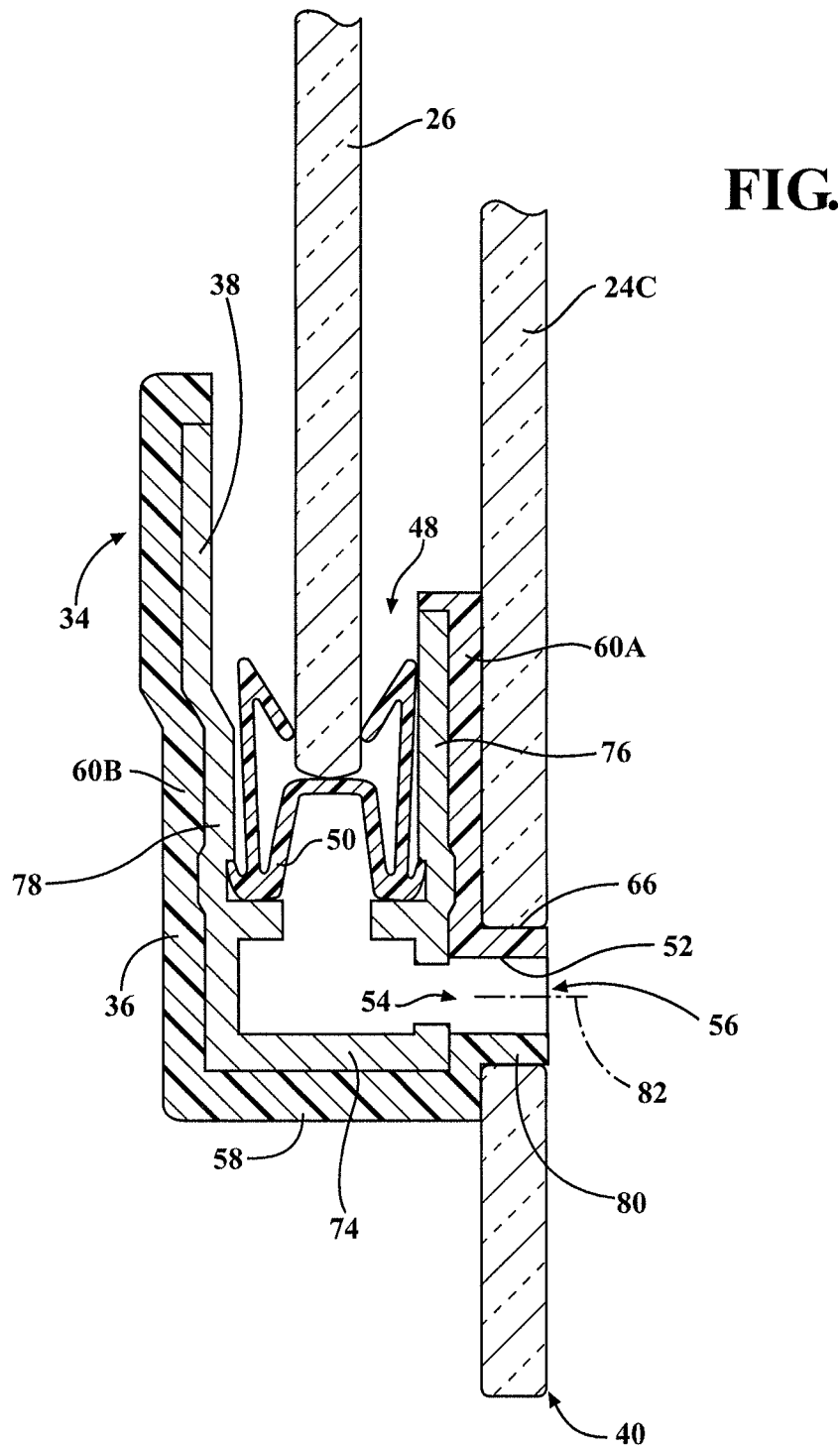
FIG. 6 is a cross-sectional view of a portion of the two-piece sliding window assembly taken along line 6-6 in FIG. 4.

In a first embodiment, the drain hole 52 is also defined by the fixed panel 24A, 24B, 24C, as shown in FIG. 6. Said differently, the fixed panel 24A, 24B, 24C defines a hole 66 in communication with the drain hole 52 for draining water from the channel 48 through the fixed panel 24A, 24B, 24C to the exterior of the vehicle 22. It is to be appreciated that when the first and second fixed panels 24A, 24B are present, the hole 66 in communication with the drain hole 52 may be defined by at least one of the first and second fixed panels 24A, 24B. Said differently, the hole 66 in communication with the drain hole 52 may be defined by either the first fixed panel 24A or the second fixed panel 24B.

When the fixed panel 24A, 24B, 24C defines the hole 66, the elongated member 36 may be configured to extend through the fixed panel 24A, 24B, 24C such that the drain hole 52 of the first embodiment is only defined by the elongated member 36 at the fixed panel 24A, 24B, 24C. Said differently, the elongated member 36 may include a projection 80 extending from the first leg 60A and disposed within the hole 66 of the fixed panel 24A, 24B, 24C. In such an embodiment, the drain hole 52 is further defined by the projection 80 of the elongated member 36 for draining water from the channel 48 through the projection 80 to the exterior of the vehicle 22. Allowing the elongated member 36 to extend through the fixed panel 24A, 24B, 24C provides a more aesthetically pleasing appearance when the sliding window assembly 20A, 20B is viewed from the exterior of the vehicle.

In the first embodiment, the drain hole 52 is visible from the exterior of the vehicle 22. Weather elements that enter the track 34 are free to flow through the drain hole 52 and exit the track 34 by gravitational forces. The drain hole 52 of the first embodiment is typically used with the two-piece sliding window assembly 20B. However, it is to be appreciated that the drain hole 52 of the first embodiment may be used with the three-piece sliding window assembly 20A. When the drain hole 52 of the first embodiment is used, the drain hole 52 may be defined by either the fixed panel 24A, 24B, 24C or the appliqué 46 disposed within the opening 28. The drain hole 52 of the first embodiment allows weather elements that enter the channel 48 of the elongated member 36 of the track 34 to exit the vehicle 22 while providing a thin profile sliding window assembly 20A, 20B. The drain hole 52 of the second embodiment may be used with either the two-piece sliding window assembly 20B or the three-piece sliding window assembly 20A.

Figure 7:
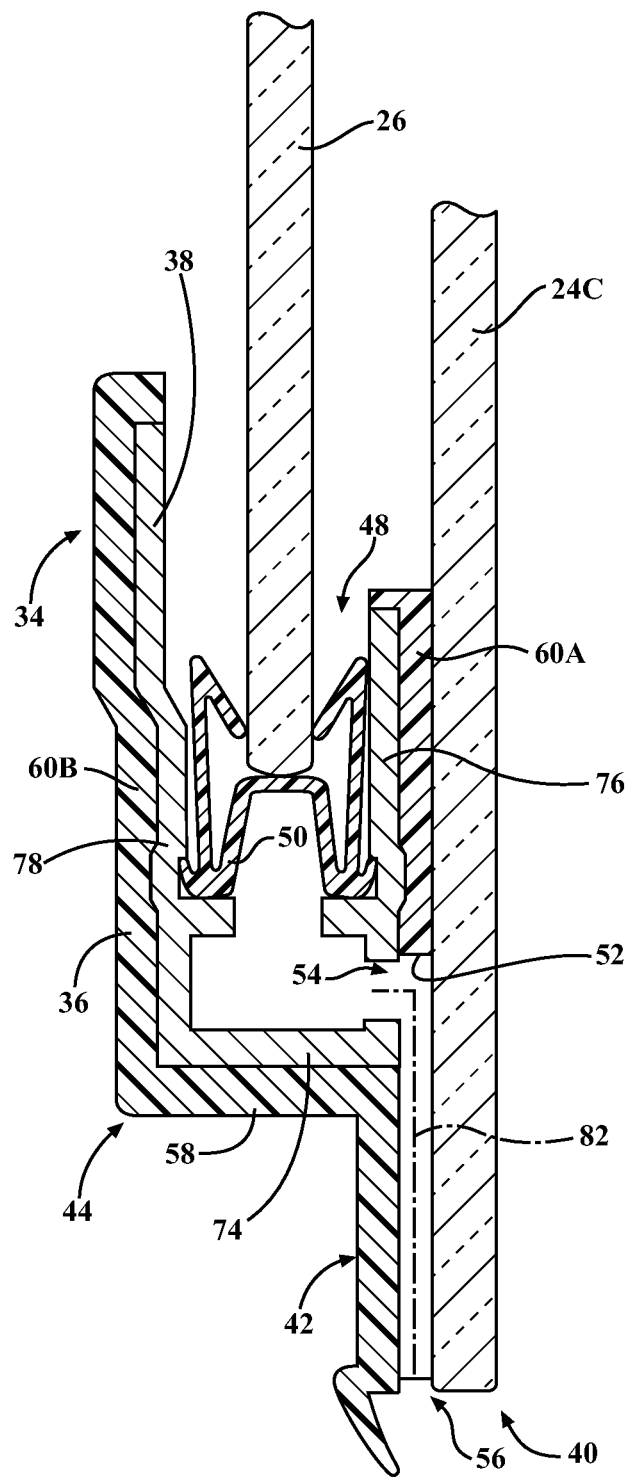
FIG. 7 is a cross-section view of a portion of the three-piece sliding window assembly taken along line 7-7 in FIG. 3.

In a second embodiment shown in FIG. 7, the first leg 60A of the elongated member 36 and the fixed panel 24A, 24B, 24C may define a drainage path 82 in communication with the drain hole 52 for draining water from the channel 48 through the drain hole 52 and along the drainage path 82 to the exterior of the vehicle 22. It is to be appreciated that the drainage path 82 may also be referred to as the drain hole 52 such that the drain hole 52 is further defined between the elongated member 36 and the fixed panel 24A, 24B, 24C. As described above, the elongated member 36 may include an attachment stem 42. When the attachment stem is present, the drainage path 82 is further defined by the attachment stem 42 and the fixed panel 24A, 24B, 24C for draining water from the channel 48 along the drainage path 82 between the attachment stem 42 and the fixed panel 24A, 24B, 24C. The drain hole 52 of the second embodiment is not easily visible from the exterior of the vehicle 22 because the drain outlet 56 lies in a vertical plane and is not horizontal. Again, the weather elements that enter the channel 48 of the elongated member 36 of the track 34 can drain from the channel 48 by gravitational forces. The drain hole 52 of the second embodiment may be used with either the two-piece sliding window assembly 20B or the three-piece sliding window assembly 20A.

Figure 8:
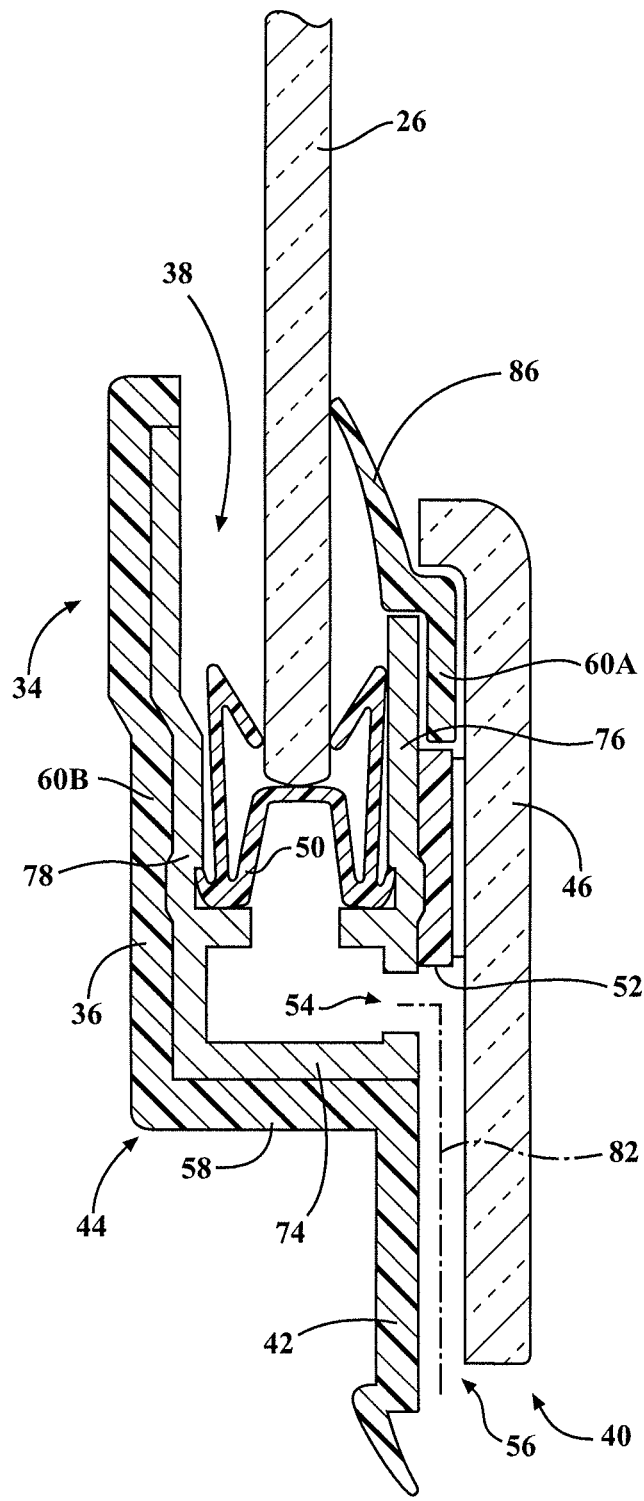
FIG. 8 is a cross-sectional view of a portion of the three-piece sliding window assembly taken along line 8-8 in FIG. 3.
Figure 9:
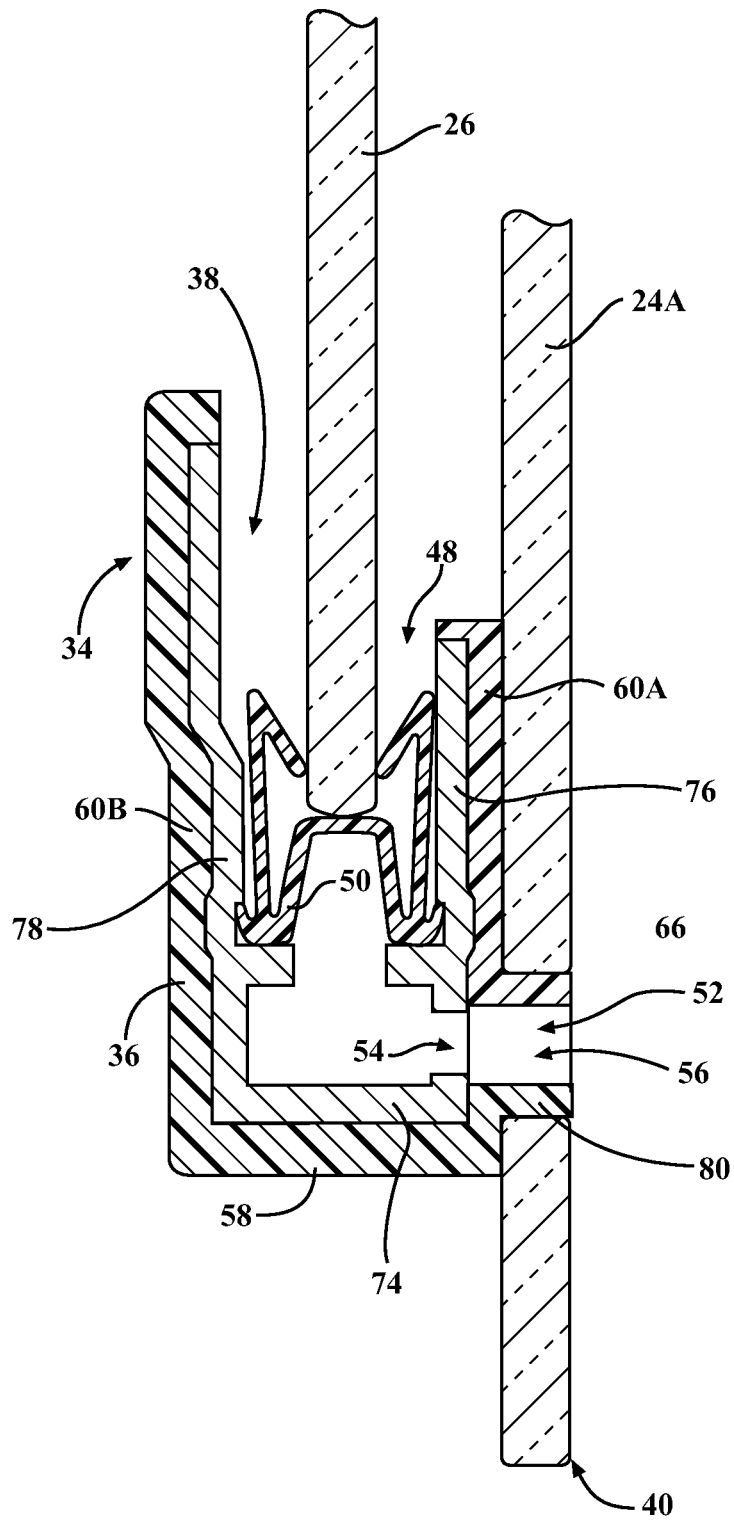
FIG. 9 is a cross-sectional view of a portion of the three-piece sliding window assembly taken along line 9-9 in FIG. 3.
Figure 10:
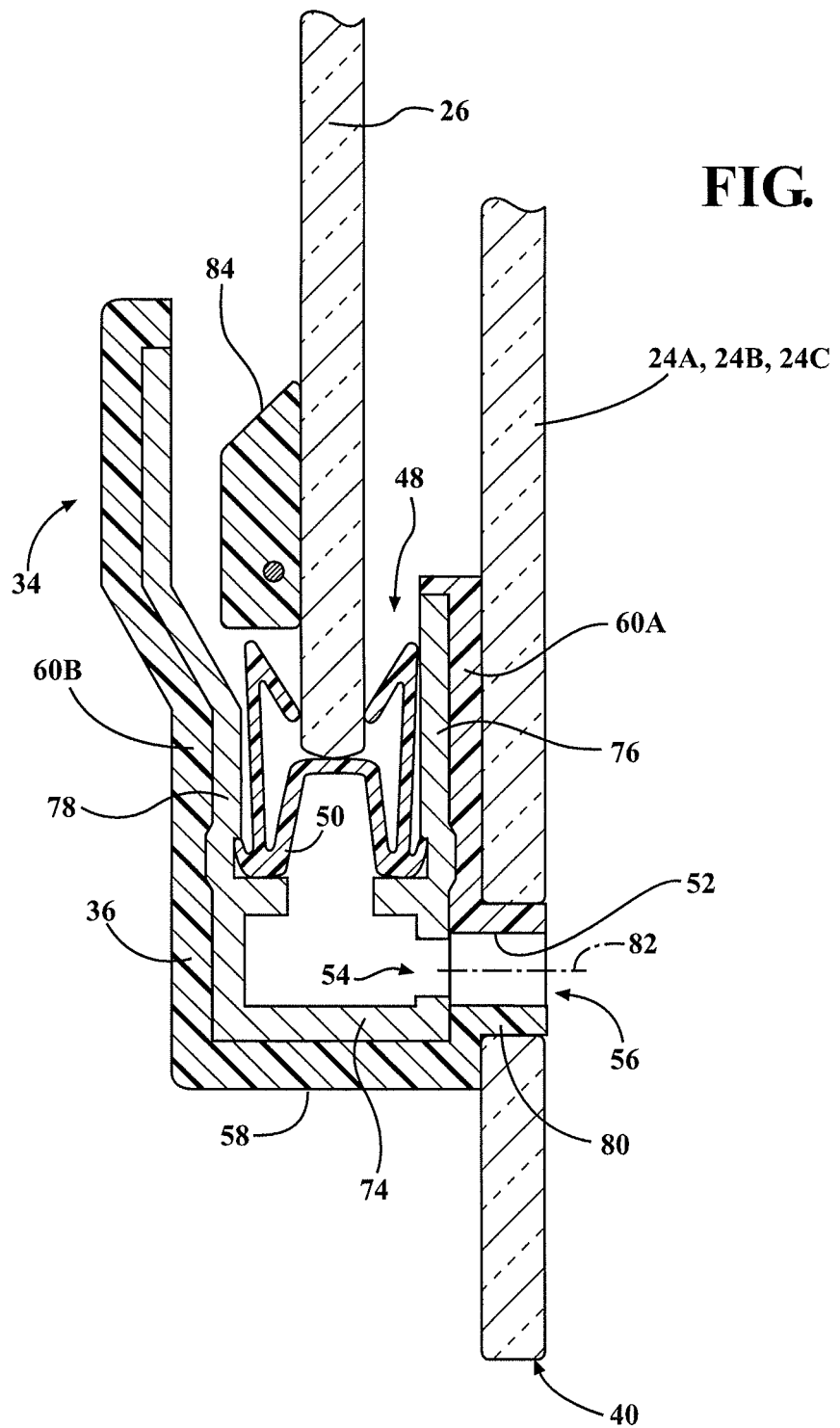
FIG. 10 is a cross-sectional view of an alternative track for the sliding window assembly.

In a third embodiment shown in FIG. 8, the drainage path 82 is defined by the elongated member 36 and the appliqué 46. In such an embodiment, the drainage path 82 is in communication with the drain hole 52 for draining water from the channel 48 through the drain hole 52 and along the drainage path 82 to the exterior of the vehicle 22. It is to be appreciated that the drainage path 82 may also be referred to as the drain hole 52 such that the drain hole 52 is further defined between the appliqué 46 and the elongated member 36. Again, the weather elements that enter the channel 48 of the elongated member 36 of the track 34 can drain from the channel 48 by gravitational forces. It is to be appreciated that when the attachment stem 42 is employed in the third embodiment, the drainage path 82 is further defined by the appliqué 46 and the attachment stem 42. Typically, the drain hole 52 of the third embodiment is only used with the three-piece sliding window assembly 20A because the two-piece sliding window assembly 20B does not include the appliqué 46.

It should be appreciated that the drain hole 52 can be of any size and shape without departing from the nature of the present invention. Additionally, it is to be appreciated that the drain hole 52 may have a serpentine configuration such that the drain outlet 56 at the exterior of the vehicle 22 is not aligned with the drain inlet 54 within the track 34. Furthermore, it is to be appreciated that the sliding window assembly 20A, 20B may include a plurality of drain holes 52. Additionally, it is to be appreciated that when the sliding window assembly 20A, 20B includes the plurality of drain holes 52, the sliding window assembly 20A, 20B may include any combination of the drain holes 52 of the first, second, or third embodiment. For example, in the three-piece sliding window assembly 20A a first drain hole 52 may be provided according to the second embodiment at the location of the fixed panel 24A, 24B, 24C and a second drain hole 52 may be provided according to the third embodiment at the location of the appliqué 46.

With reference to the two-piece sliding window assembly 20B, typically the adhesive, such as urethane adhesive, is applied to either the fixed panel 24A, 24B, 24C or, if present, the bonding surface of the attachment stem 42 for adhering the sliding window assembly 20A, 20B to the flange of the vehicle 22. Because the drain hole 52 is defined through the fixed panel 24A, 24B, 24C, gaps in the adhesive are not needed to provide drainage. As such, the sliding window assembly 20A, 20B is more secure because the entire periphery of the window can receive the adhesive thereby eliminating the gaps in the adhesive common in conventional sliding window assemblies.

As alluded to above, the sliding panel 26 can be either manually operated for moving the sliding panel 26 relative to the fixed panel 24A, 24B, 24C or the sliding panel 26 can be powered for moving the sliding panel 26 by a motor operatively coupled to the sliding panel 26. When the sliding panel 26 is powered, the track 34 may be modified by flaring the second leg 60B of the elongated member away from the sliding panel 26 to allow a coupler 84 to be attached to the sliding panel 26 to couple the sliding panel 26 to the motor to effectuate movement of the sliding panel 26.

An insert 50 may be disposed in the channel 48 of the elongated member 36 between the rail 38 and the sliding panel 26 for reducing friction as the sliding panel 26 moves relative to the fixed panel 24A, 24B, 24C. Typically, the insert 50 remains stationary as the sliding panel 26 moves along the insert 50. However, it is to be appreciated that the insert 50 may move with the sliding panel 26 such that the insert 50 moves along the elongated member 36, or, if present, the rail 38.

As shown in FIG. 8, a horizontal seal 86 may be coupled to the track 34 for sealing against the sliding panel 26. As such, the horizontal seal 86 contacts the sliding panel 26. It is to be appreciated that the horizontal seal 86 contact the sliding panel 26 when the sliding panel 26 is in the open position, closed position or any position in between.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A sliding window assembly for a vehicle, said sliding window assembly comprising:
    a plurality of fixed panels being oriented vertically;
    a sliding panel moveable relative to said plurality of fixed panels;
    a track connected to said plurality of fixed panels and being oriented horizontally with said track including an elongated member extending along a first axis and having a base portion and first and second legs extending from said base portion and opposing each other to define a channel with said first leg connected to said plurality of fixed panels and said second leg spaced laterally from said first leg;
    a rail disposed within said channel and including a first drain hole extending transversely along a second axis relative to said first axis and through a wall thereof and in communication with said channel;
    an appliqué spaced laterally from said first leg of said elongated member on a side opposite said second leg and extending horizontally to cover at least a portion of said elongated member;
    wherein said sliding panel is disposed within said channel and slidable horizontally along said track relative to said plurality of fixed panels; and
    wherein said first leg of said elongated member includes a second drain hole extending along said second axis and transversely therethrough in communication with said first drain hole and said elongated member and said appliqué define a drainage path extending along a third axis substantially perpendicular relative to and aligned with said second axis and spaced between said elongated member and said appliqué for draining water from said channel through said first drain hole and said second drain hole and directly along said drainage path to an exterior of the vehicle.

2. A sliding window assembly as set forth in claim 1 wherein said elongated member includes an attachment stem extending from the base portion of the elongated member opposite the first leg and said drainage path is further defined by said attachment stem and said appliqué for draining water from said channel along said drainage path between said attachment stem and said appliqué.

3. A sliding window assembly as set forth in claim 1 wherein said elongated member extends along said first axis and said rail is shorter than said elongated member along said first axis.

4. A sliding window assembly as set forth in claim 1 wherein said rail has a bottom wall and first and second fingers extending from said bottom wall with said first finger of said rail adjacent the first leg of the elongated member.

5. A sliding window assembly as set forth in claim 4 wherein said first drain hole is further defined by said first finger of said rail.

6. A sliding window assembly as set forth in claim 1 further comprising an insert disposed within said channel of said elongated member for reducing friction as the sliding panel moves relative to said plurality of fixed panels.

7. A sliding window assembly for a vehicle, said sliding window assembly comprising:
    a first fixed panel;
    a second fixed panel spaced longitudinally from said first fixed panel thereby defining an opening therebetween;
    a sliding panel moveable relative to said first and second fixed panels;
    a track connected to said first and second fixed panels and spanning said opening with said track including an elongated member extending along a first axis and having a base portion and first and second legs extending from said base portion and opposing each other to define a channel with said first leg connected to said first and second fixed panels and said second leg spaced laterally from said first leg;
    a rail disposed within said channel and including a first drain hole extending transversely along a second axis relative to said first axis and through a wall thereof and in communication with said channel;
    an appliqué spaced laterally from said first leg of said elongated member on a side opposite said second leg and extending longitudinally to cover said elongated member exposed between said first fixed panel and said second fixed panel;
    wherein said sliding panel is disposed within said channel and slidable longitudinally along said track relative to said first and second fixed panels; and
    wherein said first leg includes a second drain hole extending transversely along the second axis and in communication with said first drain hole for draining water from said channel wherein said elongated member and said appliqué define a drainage path extending along a third axis substantially perpendicular relative to and aligned with said second axis and in communication with said second drain hole for draining water from said channel through said first drain hole and said second drain hole and directly along said drainage path; and
    wherein said elongated member includes an attachment stem extending from said base portion of said elongated member opposite the first leg and said drainage path is further defined by said attachment stem and said appliqué opposing each other for draining water from said channel along said drainage path between said attachment stem and said appliqué.

8. A sliding window assembly as set forth in claim 7 wherein said elongated member extends along said first axis and said rail is shorter than said elongated member along said first axis.

9. A sliding window assembly as set forth in claim 7 wherein said rail has a bottom wall and first and second fingers extending from said bottom wall with said first finger of said rail adjacent the first leg of the elongated member.

10. A sliding window assembly as set forth in claim 9 wherein said first drain hole is further defined by said first finger of said rail.

11. A sliding window assembly as set forth in claim 7 further comprising an insert disposed within said channel of said elongated member for reducing friction as the sliding panel moves relative to said first and second fixed panels.

12. A sliding window assembly as set forth in claim 7 wherein said appliqué has an upper end above said drain hole and a lower end below said second drain hole.

13. A sliding window assembly as set forth in claim 12 wherein said drain path is defined by said appliqué below said second drain hole.

14. A sliding window assembly for a vehicle, said sliding window assembly comprising:
- a plurality of fixed panels spaced longitudinally;
- a sliding panel moveable relative to said plurality of fixed panels;
- a track connected to said plurality of fixed panels, said track including an elongated member extending along a first axis and having a base portion and first and second legs extending from said base portion and opposing each other to define a channel with said first leg connected to said plurality of fixed panels and said second leg spaced laterally from said first leg;
- a rail disposed within said channel and having a first bottom wall and first and second fingers extending from said bottom wall, said first finger being disposed adjacent said first leg and said second finger being disposed adjacent said second leg and said bottom wall being disposed adjacent said base portion, said first finger having a first drain hole extending transversely along a second axis relative to said first axis and therethrough;
- an appliqué spaced laterally from said first leg of said elongated member on a side opposite said second leg and extending longitudinally to cover at least a portion of said elongated member;
- wherein said sliding panel is disposed within said rail and said channel and slidable longitudinally along said track relative to said plurality of fixed panels;
- wherein said first leg of said elongated member includes a second drain hole extending along said second axis and therethrough and in communication with said first drain hole for draining water from said channel through said second drain hole and between said appliqué and said elongated member to an exterior of the vehicle;
- wherein said first leg of said elongated member and said applique define a drainage path extending along a third axis substantially perpendicular relative to and aligned with said second axis and in communication with said second drain hole for draining water from said channel through said first drain hole and said second drain hole and along said drainage path to the exterior of the vehicle; and
- wherein said elongated member includes an attachment stem extending from said base portion of said elongated member opposite said first leg and said drainage path is further defined by said attachment stem and said appliqué opposing each other for draining water from said channel directly along said drainage path between said attachment stem and said appliqué.

* * * * *